United States Patent [19]
Fring

[11] Patent Number: 5,947,800
[45] Date of Patent: Sep. 7, 1999

[54] PNEUMATIC SUCTION SURFACE BLASTING APPARATUS WITH AN IMPROVED MEDIA DELIVERY REGULATING SYSTEM

[75] Inventor: Craig C. Fring, Morrisville, Pa.

[73] Assignee: Empire Abrasive Equipment Company, Langhorne, Pa.

[21] Appl. No.: 08/814,300

[22] Filed: Mar. 10, 1997

[51] Int. Cl.$^6$ ................................................... B24C 7/00
[52] U.S. Cl. ............................................. 451/99; 451/101
[58] Field of Search ................................ 451/99, 87, 75, 451/89, 39, 101

[56] References Cited

U.S. PATENT DOCUMENTS

| | | | |
|---|---|---|---|
| 847,269 | 3/1907 | Wise | 451/87 |
| 2,114,573 | 4/1938 | Rhodes . | |
| 3,162,986 | 12/1964 | Olivieri . | |
| 3,201,901 | 8/1965 | Pauli . | |
| 3,266,193 | 8/1966 | McCune . | |
| 3,331,163 | 7/1967 | Gregory | 451/78 |
| 3,618,263 | 11/1971 | Weijsenburg . | |
| 3,741,738 | 6/1973 | Dowgin . | |
| 3,768,210 | 10/1973 | Johnson et al. . | |
| 4,048,757 | 9/1977 | Kubus et al. . | |
| 4,075,789 | 2/1978 | Dremann . | |
| 4,709,515 | 12/1987 | Copeland et al. . | |
| 4,854,090 | 8/1989 | Heron et al. . | |
| 5,588,901 | 12/1996 | Rubey, III et al. | 451/99 |

*Primary Examiner*—Robert A. Rose
*Attorney, Agent, or Firm*—Sperry, Zoda & Kane

[57] ABSTRACT

An apparatus for cleaning or treating by blasting of a surface which includes an enhanced media delivery regulating system which includes supplying high pressure air to a suction gun and using this to draw blasting media and ambient or low pressure conveying air thereinto for high pressure expulsion therefrom. The high pressure air forms a vacuum over the media vacuum line which draws particulate blasting media from a hopper and conveying air separately. The conveying air is provided from a closed environment within the hopper above the particulate blasting media to control the pressure at which the conveying air is provided at a value equal to or less than the pressure at which the particulate blasting media is provided to the regulator. The regulator preferably includes a metering conduit defining a metering opening therethrough spaced from the interior walls of the regulator and spaced from the point of input of the conveying air and the pointed output through the media vacuum line for movement toward the blasting gun in order to enhance the flow characteristics of the media. This regulator provides unique dimensional restrictions and orientations which significantly enhance the flow of particulate blasting media through the regulator to the gun for surface blasting.

19 Claims, 2 Drawing Sheets

PNEUMATIC SUCTION SURFACE BLASTING APPARATUS WITH AN IMPROVED MEDIA DELIVERY REGULATING SYSTEM

BACKGROUND OF THE INVENTION

1. Field of the Invention

The present invention relates to the field of devices utilized for surface treatment. Treatment of surfaces of material is achieved in many ways, one of which is surface blasting. Surface blasting has unique advantages over other methods of treatment since non-planar surfaces can be effectively treated using blasting by particulate media expelled from a blasting gun at high speed.

Such treatments include surface cleaning such as removing rust from iron or paint from painted surfaces or can be utilized for many other purposes such as modifying surface texture, color, adherence qualities, reflectance or any of a myriad of different properties which a surface may have. Also blasting is commonly used for shot peening to enhance structural strength of treated material.

Such blasting techniques usually utilize particulate blasting materials such as glass beads, etc. The choice of the blasting media is determined by the hardness of the surface and the characteristics of the blasting apparatus. Basically such blasting configurations do fall into two generic categories. The first category is the high pressure blasting systems wherein high pressure air and blasting media are both supplied under high pressure to a blasting nozzle for expelling therefrom and surface treatment by blasting. The second category to which the present invention pertains is suction surface blasting devices. Such devices utilize a high pressure air line supplied to a blasting gun utilized to create a vacuum in a second line extending into the gun such that media is drawn through this second line for mixing with the high pressure air within the gun to impart a high kinetic energy thereto for expelling from the gun for surface blasting. The problems associated with the suction system are completely separate and distinct from those experienced in the design of equipment for high pressure blasting. The present invention deals with the second category or suction surface blasting characteristics utilizing high pressure air and, as such, is deemed to be pneumatic and provides a unique improved media delivery regulating system not shown or suggested in any previous suction blasting apparatus designed heretofore.

2. Description of the Prior Art

Numerous prior art designs have been devised for both high pressure and suction surface blasting such as shown in U.S. Pat. No. 2,114,573 patented Apr. 19, 1938 to G. F. Rhodes on a "Sand Blasting Process"; and U.S. Pat. No. 3,162,986 patented Dec. 29, 1964 to L. Olivieri and assigned to Compagnie de Saint-Gobain on a "Method And Apparatus For Feeding Abrasives"; and U.S. Pat. No. 3,201,901 patented Aug. 24, 1965 to A. M. Pauli on "Abrasive Blasting Equipment"; and U.S. Pat. No. 3,266,193 patented Aug. 16, 1966 to J. D. McCune and assigned to Schlumberger Well Surveying Corporation on a "Sand Supply Container"; and U.S. Pat. No. 3,618,263 patented Nov. 9, 1971 to P. T. weijsenburg and assigned to Atlas Copco Aktiebolag on a "Sandblasting Installation"; and U.S. Pat. No. 3,741,738 patented Jun. 26, 1973 to R. Dowgin and assigned to Pauli & Griffin Co. on "Abrasive Blasting Equipment And Self-Cleaning Abrasive Trap Therefore"; and U.S. Pat. No. 3,768,210 patented Oct. 30, 1973 to C. Johnson et al on an "Automatic Sandblast Machine"; and U.S. Pat. No. 4,048,757 patented Sep. 20, 1977 to J. Kubus et al and assigned to Union Carbide Corporation on a "System For Metering Abrasive Materials"; and U.S. Pat. No. 4,075,789 patented Feb. 28, 1978 to G. Dremann on an "Abrasive System Having A Modulation Function"; and U.S. Pat. No. 4,709,515 patented Dec. 1, 1987 to H. Copeland et al on a "Wet Sandblasting System"; and U.S. Pat. No. 4,854,090 patented Aug. 8, 1989 to R. Heron et al and assigned to The British Hydromechanics Research Association on "Feeding Abrasive Material"; and U.S. Pat. No. 4,959,931 patented Oct. 2, 1990 to R. Howells and assigned to Air Products And Chemicals, Inc. on a "Method And Apparatus For Preventing Binding And Overloading Of Media Feed Screw Conveyor"; and U.S. Pat. No. 5,035,089 patented Jul. 30, 1991 to W. Tillman et al and assigned to Pauli & Griffin on a "Blast Media Recovery And Cleaning System"; and U.S. Pat. No. 5,081,799 patented Jan. 21, 1992 to L. Kirschner et al and assigned to Church & Dwight Co., Inc. on "Blasting Apparatus"; and U.S. Pat. No. 5,083,402 patented Jan. 28, 1992 to L. Kirschner et al and assigned to Church & Dwight Co., Ind. on "Blasting Apparatus"; and U.S. Pat. No. 5,107,630 patented Apr. 28, 1992 to J. Lodewijk and assigned to L.T.C. International B.V. on "Abrasive Blasting Apparatus"; and U.S. Pat. No. 5,123,206 patented Jun. 23, 1992 to J. Woodson and assigned to Whitemetal, Inc. on a "Wet Abrasive Blasting Method"; and U.S. Pat. No. 5,216,848 patented Jun. 8, 1993 to K. Abbott et al and assigned to Stripping Technologies Inc. on "Dual Controls For An Abrasive Blast System"; and U.S. Pat. No. 5,230,185 patented Jul. 27, 1993 to L. Kirschner et al and assigned to Church & Dwight Co., Inc. on a "Blasting Apparatus And Method"; and U.S. Pat. No. 5,325,638 patented Jul. 5, 1994 to W. Lynn on a "Pliant Media Blasting Device"; and U.S. Pat. No. 5,407,379 patented Apr. 18, 1995 to J. Shank et al and assigned to Church & Dwight Co., Inc. on a "Differential Pressure Metering And Dispensing system For Abrasive Media"; and U.S. Pat. No. 5,421,767 patented Jun. 6, 1995 to W. Spears, Jr. et al and assigned to Church & Dwight Co., Inc. on a "Media Control Valve"; and U.S. Pat. No. 5,468,174 patented Nov. 21, 1995 to D. Bachand et al and assigned to IPEC Advanced Systems, Inc. on a "Recyclable Abrasive Blasting System".

SUMMARY OF THE INVENTION

The present invention provides a pneumatic suction surface blasting apparatus which includes an improved media delivery regulator design which can be used with any type of particulate blasting media such as glass. The configuration includes a suction blasting gun defining a high pressure air inlet and a gun media inlet each being in full fluid flow communication with respect to the mixing chamber. In this manner mixing of materials entering the mixing chamber through the high pressure air inlet and the media inlet will be effectively achieved. The suction blasting gun may preferably include an outlet nozzle in fluid flow communication with the mixing chamber in order to guide the expulsion of blasting media therefrom. The high pressure air inlet is preferably oriented within the suction blasting gun in such a manner as to supply high pressure air adjacent to the gun media inlet in such a manner as to create a vacuum therewithin to aid in the drawing of blasting media and conveying air therethrough.

A high pressure air line may also be included and positioned operatively secured to any convenient source of high pressure air. This high pressure air line is also connected preferably at the other end thereof to the high pressure air inlet in such a manner as to supply high pressure air to the mixing chamber through the outlet and on through the outlet nozzle in such a manner as to form a suction at the gun media inlet to facilitate drawing of particulate blasting media inwardly therethrough and for expelling thereof under high pressure through the outlet nozzle for pneumatic surface blasting.

The apparatus of the present invention further includes a storage hopper defining a media supply chamber therein for holding blasting media for selective supply thereof for surface blasting. The storage hopper defines a media outlet preferably therein in fluid flow communication with the media supply chamber and preferably located therebelow to make use of gravitational force to facilitate flow and aid in exiting of media therefrom. The storage hopper may further define an access port therein in fluid flow communication with the media supply chamber at a position above the level of blasting media retained therewithin.

A media supply regulator may also be included operatively secured to the media outlet of the storage hopper for supplying of blasting media and air for conveying of the media. The construction of the media supply regulator preferably includes a regulator housing being generally T-shaped and defining a regulator chamber therewithin designed to mix media with conveying air to facilitate flow to the suction blasting gun.

The regulator housing preferably includes a lower interior wall and defines therein a media inlet and a conveying air inlet and a media and air vacuum outlet which are each in fluid flow communication with respect to the regulator chamber. Preferably the media inlet is in operative fluid flow communication with respect to the media outlet of the storage hopper in such a manner as to receive blasting media. The conveying air inlet and the media and air vacuum outlet are preferably oriented co-linear with respect to one another to facilitate the flow of conveying air therealong responsive to vacuum.

A conveying air line may also be preferably included which is operatively secured to the conveying air inlet and the regulator housing in such a manner as to supply conveying air to the regulator chamber. This conveying air line is operatively secured to the access port defined in the storage hopper in such a manner as to receive conveying air from the media supply chamber at the same pressure as within the media supply chamber in such a manner as to prevent conveying air from being supplied to the regulator chamber at a pressure greater than the pressure at which the blasting media is supplied thereto through the media outlet. The actual pressure of the conveying air at the regulator will vary depending on the length of the conveying air line. The longer the conveying air line is the greater the reduction in pressure will be in the conveying air from the point of the access opening downstream to the point at which conveying air passes into the regulator through the conveying air inlet means.

A media metering nozzle is preferably included positioned extending through the media inlet into the regulator chamber. This media metering nozzle preferably defines a metering conduit extending therethrough for controlling the supplying of blasting media from the media supply chamber to the regulator chamber within the media supply regulator. The media metering nozzle further preferably includes a metering conduit dispensing opening designed to control the dispensing of blasting media through the media inlet directly into the regulator chamber. This media metering nozzle is preferably tubular in shape in such a manner as to define the metering conduit extending axially therethrough. The media metering nozzle further includes a metering orifice plate being generally annularly shaped and extending over the metering conduit opening. The metering orifice plate is preferably integrally formed with respect to the media metering nozzle. This metering orifice plate also preferably defines a metering orifice therein to further control dispensing of blasting media from the storage hopper to the media supply regulator. Preferably this metering orifice will be positioned approximately 0.5 inches from the media and air vacuum outlet of the regulator housing in order to facilitate full flow movement of blasting media and conveying air thereto. The metering orifice also is spatially disposed from the lower interior wall means by approximately $13/16$ inch in order to provide sufficient clearance to aid in fully effective media flow during operating and blasting. The metering orifice further is preferably oriented perpendicularly with respect to the conveying air inlet and the media and air vacuum outlet and spatially disposed at a position therebetween to further enhance flow of media therefrom.

Further the present invention preferably includes a media vacuum line operatively secured to the gun media inlet of the suction blasting gun and also operatively secured to the media and air vacuum outlet of the regulator housing. In this manner the supplying of conveying air and blasting media under vacuum through this line will be facilitated. Thus, media and conveying air will be moved responsive to suction or vacuum into the mixing chamber of the suction blasting gun to facilitate surface blasting therefrom. Also, the present invention may include a media reclamation apparatus for collecting media after blasting therewith and for re-supplying of this media to the storage hopper for re-use. Such media reclamation apparatus can include an apparatus for cleaning, drying or otherwise treating the media as desired based on the currently used application. Such media reclamation systems tend to vary the air pressure within the storage hopper. The present invention as described above provides a system wherein the media metering nozzle is encapsulated within an environment of lesser or equal pressure than the media thereabove or any external ambient pressures. This is achieved by allowing the conveying air line to be connected directly to the hopper above any possible location of media therein. In this manner the air pressure within the hopper which may for various reasons including operation of the media reclamation system does not in any manner reduce particulate media flow. The flow is maintained due to the fact that the conveying air is supplied to the dispensed media at a pressure equal to or below the pressure existing currently within the media storage hopper.

It is an object of the present invention to provide a pneumatic suction surface blasting apparatus having an improved media delivery regulating system which is usable with various types of particulate blasting material.

It is an object of the present invention to provide a pneumatic suction surface blasting apparatus having an improved media delivery regulating system which is usable with glass bead blasting media.

It is an object of the present invention to provide a pneumatic suction surface blasting apparatus having an improved media delivery regulating system which has minimal initial capital costs.

It is an object of the present invention to provide a pneumatic suction surface blasting apparatus having an improved media delivery regulating system which has minimal maintenance costs.

It is an object of the present invention to provide a pneumatic suction surface blasting apparatus having an improved media delivery regulating system which has minimal maintenance requirements.

It is an object of the present invention to provide a pneumatic suction surface blasting apparatus having an improved media delivery regulating system which has limited down time.

It is an object of the present invention to provide a pneumatic suction surface blasting apparatus having an improved media delivery regulating system which is easily repaired.

It is an object of the present invention to provide a pneumatic suction surface blasting apparatus having an improved media delivery regulating system which is easily accessible.

It is an object of the present invention to provide a pneumatic suction surface blasting apparatus having an improved media delivery regulating system which is usable with any type of high pressure air source.

It is an object of the present invention to provide a pneumatic suction surface blasting apparatus having an improved media delivery regulating system which significantly improves the media delivery system of a suction blasting system.

It is an object of the present invention to provide a pneumatic suction surface blasting apparatus having an improved media delivery regulating system which encapsulates the metering orifice within a low pressure environment to facilitate dispensing of media therethrough.

It is an object of the present invention to provide a pneumatic suction surface blasting apparatus having an improved media delivery regulating system which delivers media in a smooth, consistent and repeatable manner for blasting by a suction gun.

It is an object of the present invention to provide a pneumatic suction surface blasting apparatus having an improved media delivery regulating system where contact of the blasting media with high pressure air is eliminated until the media enters the blasting gun for expelling thereof for blasting.

It is an object of the present invention to provide a pneumatic suction surface blasting apparatus having an improved media delivery regulating system wherein the possibility of clogging of the dispensing orifice is minimized.

It is an object of the present invention to provide a pneumatic suction surface blasting apparatus having an improved media delivery regulating system wherein disruptions or stoppages of media flow are virtually eliminated.

It is an object of the present invention to provide a pneumatic suction surface blasting apparatus having an improved media delivery regulating system wherein use in variable ambient air conditions is possible.

It is an object of the present invention to provide a pneumatic suction surface blasting apparatus having an improved media delivery regulating system wherein use with extremely lightweight media is possible.

It is an object of the present invention to provide a pneumatic suction surface blasting apparatus having an improved media delivery regulating system wherein ambient air under ambient air pressure is excluded from the interior portion of the regulator.

It is an object of the present invention to provide a pneumatic suction surface blasting apparatus having an improved media delivery regulating system wherein a fixed non-variable orifice can be utilized since monitoring movement of media from the hopper for dispensing to the blasting gun is no longer necessary.

It is an object of the present invention to provide a pneumatic suction surface blasting apparatus having an improved media delivery regulating system wherein monitoring to determine whether the mix of blasting media is rich or lean is no longer necessary.

BRIEF DESCRIPTION OF THE DRAWING

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
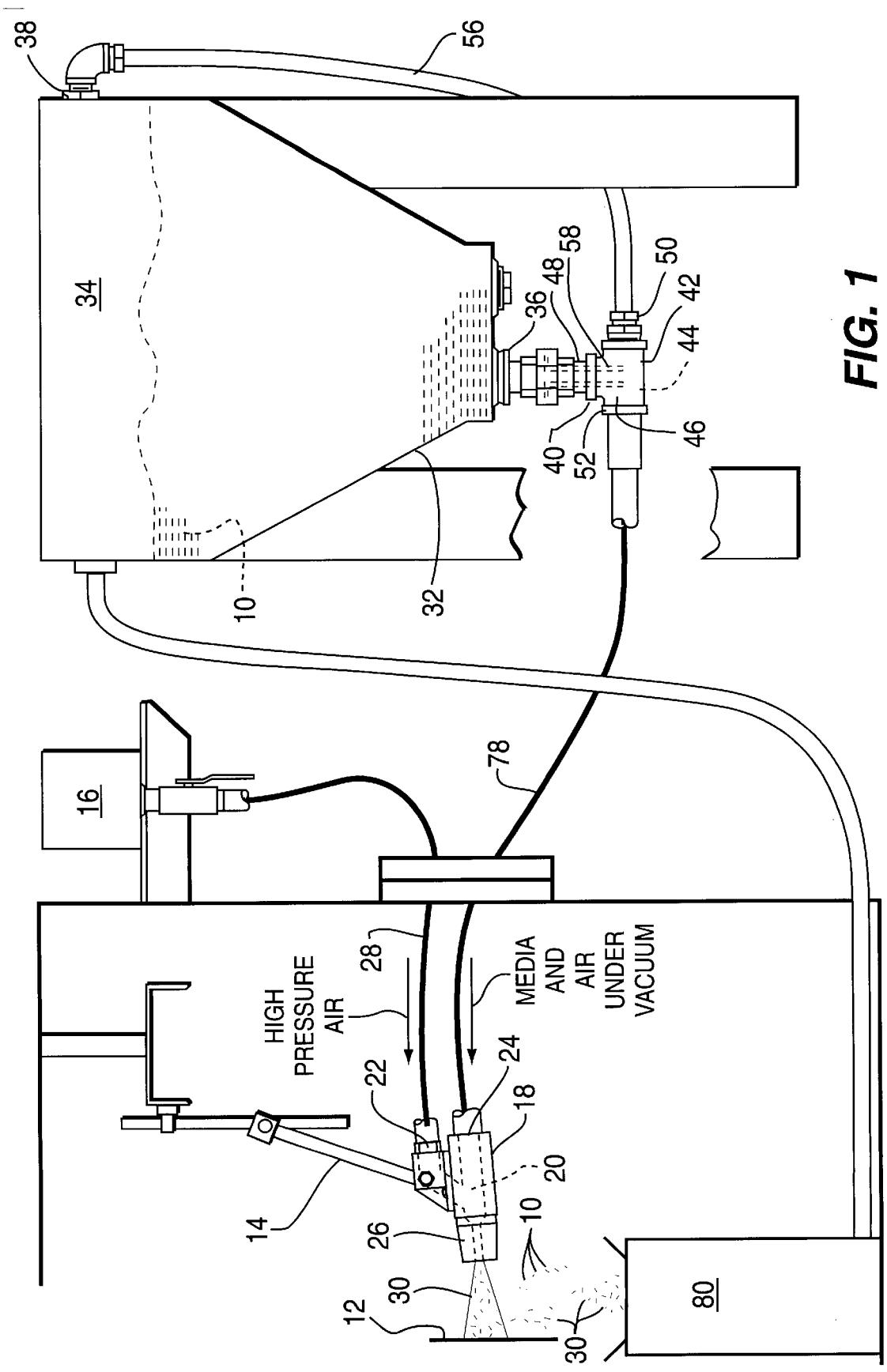
FIG. 1 is a schematic illustration of an embodiment of the pneumatic suction surface blasting apparatus with an improved media delivery regulating system of the present invention.
Figure 2:
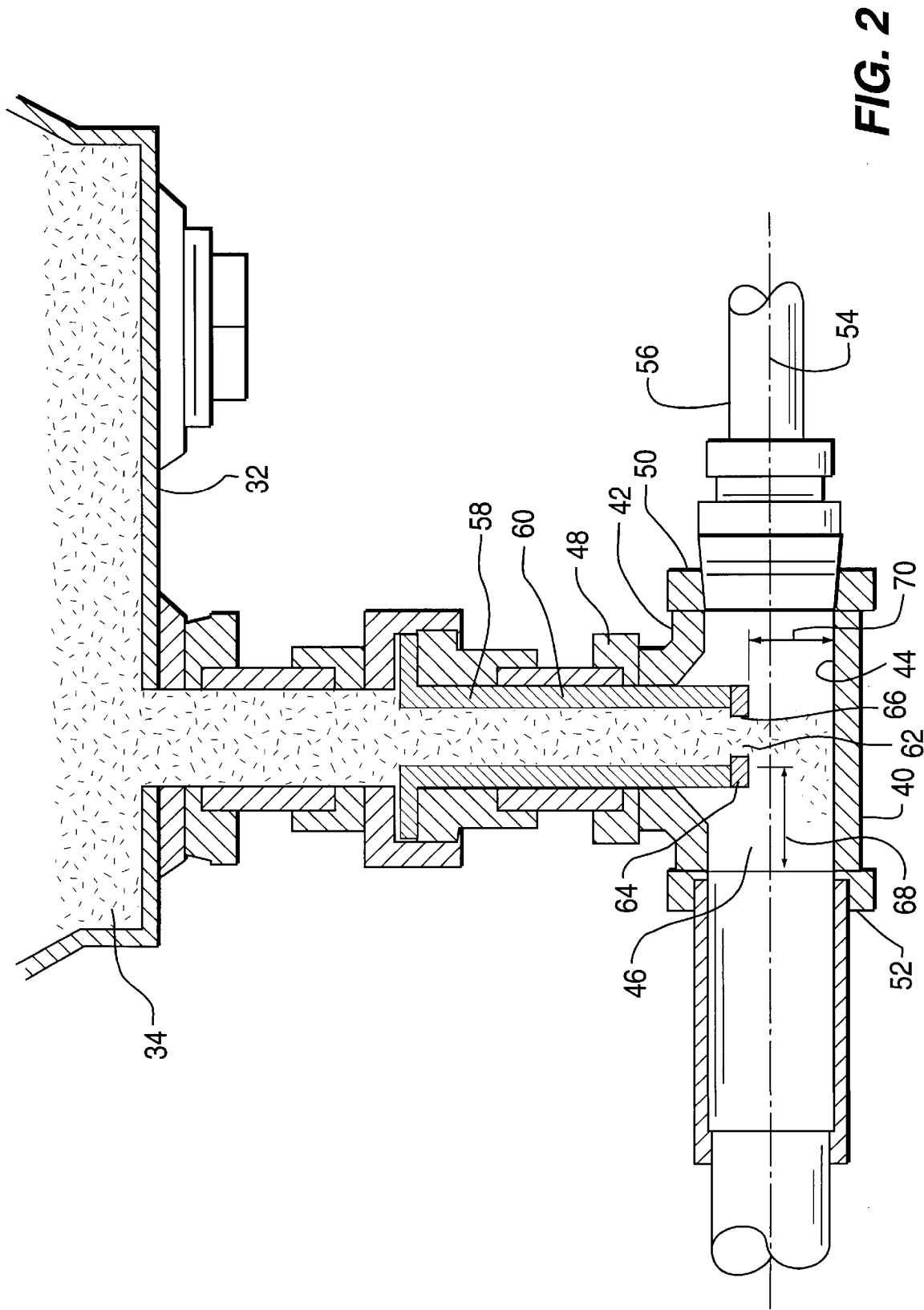
FIG. 2 is an exploded side cross-sectional view of an embodiment of the media supply regulator device and adjacent structure.

The present invention provides a pneumatic suction surface blasting apparatus using an improved media delivery regulating system for expelling particulate blasting media 10 onto the surface 12 of a planar or otherwise shaped substrate or item. A suction blasting gun 18 is preferably suspended by a gun support arm or bracket member 14 to facilitate aiming and placement thereof adjacent to the surface 12 to be blasted.

Such blasting can be performed for various purposes. The surface may be desired to be treated to change the texture, reflectance or other characteristics thereof. Other uses for such blasting systems are for cleaning, shot peening or rust removal. Once the suction blasting gun 18 is accurately aimed as desired toward the surface 12 operation of the blasting apparatus can be initiated. With a suction blasting system a source of high pressure air 16 is connected through a high pressure air supply line 28 to the blasting gun. The blasting gun preferably defines a mixing chamber 20 therewithin which is designed to receive media for blasting and high pressure air for conveying of the media outwardly through the outlet nozzle 26 of the blasting gun as desired. The configuration of the gun 18 with the mixing chamber 20 therewithin also includes a high pressure air inlet 22 for receiving air from a high pressure air line 28 as well as a gun media inlet 24 designed to receive blasting media. The gun media inlet 24 and the high pressure air inlet 22 are both in full fluid flow communication with respect to the mixing chamber 20. Mixing chamber 20 is also in full fluid flow communication with the outlet nozzle 26 thereof for expelling of blasting media outwardly therethrough at high pressure for surface blasting.

As shown in the figure the high speed expulsion of the mixture of high pressure air and blasting media achieves a pattern shown as expelled blasting media 30 in FIG. 1. This expelled blasting media 30 is particularly adapted for surface treatment of any shaped surface and is particularly useful for blasting of three-dimensional shaped objects which might otherwise require an extensive amount of treatment to achieve the desired surface.

Within the suction blasting gun 18 preferably the high pressure air inlet 22 is positioned with respect to the gun media inlet 24 such that as high pressure air passes through air inlet 22 into the mixing chamber 20 a vacuum is created within the gun media inlet 24. This is commonly known as the Venturi principle, that is, high speed air rushing by an aperture creates a vacuum within the aperture which can create a suction for use in various purposes which in this case is the drawing of particulate blasting media and conveying air therethrough.

The particulate blasting media 10 of the present invention is retained within a storage hopper 32. Storage hopper 32 preferably defines a media supply chamber 34 therewithin which includes a media outlet 36 preferably in the lower portion thereof to make use of gravitational force to aid in media flow outwardly therethrough. An access port 38 may also be defined by the storage hopper above the level of particulate blasting media 10 stored therein in order to provide a source of conveying air for aiding movement of the media 10 toward the gun 18 during operation.

A media supply regulator 40 is preferably connected with respect to the storage hopper 32 at least at the lower end thereof adjacent the media outlet 36. Media supply regulator 40 preferably includes a regulator housing 42 defining a plurality of interior walls which includes a lower interior wall 44 which is preferably horizontally extending. The regulator housing 42 further defines a regulator chamber 46 therewithin which is designed to mix media 10 within conveying air to facilitate flow thereof toward the blasting gun 18. To facilitate entry of media into the regulator chamber 46 a media inlet 48 is defined in this regulator housing and is connected to the media outlet 36 of the storage hopper 32. In this manner flow from the storage hopper 32 to the regulator chamber 46 is facilitated.

Regulator housing 42 also preferably defines a conveying air inlet 50 positioned spatially disposed from the media inlet 48 and adapted to provide conveying air to the media supply regulator 40 for aiding in movement of particulate blasting media 10 toward the gun 18. Also the regulator housing 42 defines a media and air vacuum outlet 52 which is designed to provide the outlet within the regulator chamber 46 for the mixture of conveying air and blasting media 10.

Preferably the orientation of the conveying air inlet 50 and the media and air vacuum outlet 52 is such that they are spatially disposed from one another but have a co-linear axis 54. That is, the outlet and the inlet are aligned and preferably horizontally register with respect to one another such as to facilitate the flow of conveying air from the conveying air inlet 50 to the media and air vacuum outlet 52 but are spaced apart from one another to facilitate the introduction of media therebetween.

With this configuration a conveying air line 56 preferably connects the conveying air inlet 50 of the regulator 40 with respect to the access port 38 of the storage hopper 32. In this manner conveying air is supplied through the conveying air line 56 from the space within the storage hopper 32 above the media 10.

Movement of media 10 from the storage hopper 32 is accurately controlled by the inclusion of a media metering nozzle 58. Nozzle 58 preferably defines a metering conduit 60 extending axially therethrough and, as such, is of a generally tubular shape. The metering conduit 60 preferably defines a metering conduit dispensing opening 62 in the lowermost end thereof which controls the amount of media 10 moving from the storage hopper 32 into the media supply regulator 40. Preferably the metering conduit dispensing opening 62 includes a metering orifice plate 64 which is of a generally flat annular shape extending thereover and defining a metering orifice 66 therein. This metering orifice 66 is the actual orifice through which the media 10 moves as it attempts to exit the storage hopper 32 for movement into the regulator chamber 46 of the media supply regulator 40. The size of this metering orifice 66 can greatly vary the flow rate and characteristics of the media and, as such, is particularly significant. This size of metering orifice 66 can be modified by merely removal and replacement of the metering conduit in order to define a differently sized orifice for feeding blasting media which may be found to be useful for different processes or under different operating conditions.

Also important is the positioning of the metering orifice 66 with respect to the input and output ports of the media supply regulator 40 and the opposing wall thereof. The opposing wall is the preferably horizontally extending lower interior wall 44. With the metering orifice 66 oriented horizontally and the opposing wall extending horizontally it is preferable that they be spaced apart at approximately $13/16$ inch. This spacing is important to allow for the full mixing of blasting media 10 with the conveying air entering the regulator chamber 46 through the conveying air inlet 50. It is important also that this mixture be maintained during movement through the regulator chamber 46 toward the media and air vacuum outlet means 52. This is achieved by maintaining the spacing between the metering conduit 60 and the media and air vacuum outlet means 52 at approximately one-half inch. Note reference numeral 68 which is directed to the spacing of 0.5 inches between the media and air vacuum outlet 52 and the metering conduit 58. Also note reference number 70 referring to the spacing of approximately $13/16$ inch between the metering orifice 66 and the lower interior wall 44 within the media supply regulator 40 defined in the regulator housing 42.

Once the mixture of media 10 and conveying air passes through the media and air vacuum outlet 52 it will enter the media vacuum line means 78. This line is connected to the gun media inlet 24 which as described above is under a slight vacuum or suction due to the relative positioning of the high pressure air inlet 22 with the gun 18 thereadjacent. As such, a slight vacuum is created within the media vacuum line 78 which urges movement of the mixture of blasting media 10 and conveying air through the media and air vacuum outlet 52 and into the media vacuum line 78 for traveling to the gun 18.

In operation the present system tends to have varying air pressure within the storage hopper 32. This varying pressure can be caused by various external influences and is often caused by the use of a media reclamation apparatus 80 shown in FIG. 1. This reclamation apparatus is designed to gather and possibly clean the particulate blasting media after use thereof and then re-supplying same to the storage hopper 32. Use of these systems and other external systems tend to vary the air pressure within the storage hopper 32. These variations in air pressure can be a problem because in those situations wherein a slight vacuum is created within the storage hopper 32 the flow of media through the media outlet 36 to the media supply regulator 40 can be adversely affected. The flow could be stopped or a clogging could occur or flow could become intermittent. These problems which often occur in the prior art have been addressed by requiring continuous monitoring of the flow of media toward the gun 18 to determine whether the mixture is too rich or too lean, that is, whether there is too much media introduced or too little media introduced to achieve effective blasting.

One of the unique aspects of the present apparatus is the ability to accurately control the pressure and thereby regulate media flow. The apparatus of the present invention is designed such that the pressure within the storage hopper 32 also becomes the pressure within the conveying air line 56. In fact, due to the fact that the conveying air line extends from the uppermost portion in the storage hopper 32 to the media regulator 40, there will actually be a slight pressure drop over the length of this conveying air line 56. Such a line normally might be a one-half inch diameter line and, as such, one would expect a small pressure drop over lengths thereof. In fact, the longer the conveying air line is chosen to be the greater the pressure drop will be. Thus the conveyed air supplied therethrough to the regulator chamber 46 will always be at a pressure equal to or slightly less than the air pressure within the storage hopper 32. This will be true regardless of the actual pressure within the storage hopper 32 due to the fact that the pressure of the conveying air is self-controlled responsive to the environment to which it is exposed which is solely the interior environment of a hopper. Preferably the hopper is sealed with respect to the ambient external environment to eliminate the flow of any ambient air into the conveying air line 56. In this manner the metering orifice 66 will be encapsulated within a low pressure environment. That is, a pressure environment equal to or lower than the pressure within the storage hopper from which the blasting media is passing through the metering orifice. This will eliminate effectively any exterior high pressure air from entering and moving up through the orifice which has heretofore had the effect of disrupting or stopping media flow and thereby requiring continuous monitoring and maintenance. The excluding of ambient air from the regulator is an important characteristic of the present invention which makes it a significant advance over prior art designs. Also, the present design can be utilized with a fixed metering orifice 66 which does not have variable size Some prior art devices utilize variable sized orifices for the purpose of continuously monitoring and controlling media flow to be assured that the flow is smooth and continuous.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A pneumatic suction surface blasting apparatus having an improved media delivery regulating system being usable with various types of particulate blasting media comprising:

A. a suction blasting gun means defining a mixing chamber means therewithin, said suction blasting gun means further defining a high pressure air inlet means and a gun media inlet means each being in fluid flow communication with respect to said mixing chamber means defined therewithin to facilitate mixing of materials entering said mixing chamber means through said high pressure air inlet means and said media inlet means, said suction blasting gun means further including an outlet nozzle means in fluid flow communication with said mixing chamber means to guide expulsion therefrom;

B. a high pressure air line means operatively secured to a supply of high pressure air and to said high pressure air inlet means to supply high pressure air to said mixing chamber and through said outlet nozzle means in order to generate a suction at said gun media inlet means to facilitate drawing of particulate blasting media inwardly therethrough and for expelling thereof under high pressure through said outlet nozzle means for pneumatic surface blasting;

C. a storage hopper means defining a media supply chamber means therewithin sealed with respect to the external ambient environment for holding blasting media for selective supply thereof for surface blasting, said media supply chamber means being unpressurized in order to be at a pressure therein not greater than ambient atmospheric pressure, said storage hopper means defining a media outlet means therein in fluid flow communication with said media supply chamber means to facilitate exiting of media therefrom to facilitate blasting, said storage hopper means further defining an access port means therein in fluid flow communication with said media supply chamber means therewithin at a position above the level of blasting media retained therein;

D. a media supply regulator means operatively secured to said media outlet means of said storage hopper means for supplying of blasting media and air for conveying thereof, said media supply regulator means comprising:

(1) a regulator housing means defining a regulator chamber means therewithin for mixing media with conveying air, said regulator housing means further defining a media inlet means, a conveying air inlet means and a media and air vacuum outlet means each being in fluid flow communication with respect to said regulator chamber means, said media inlet means being in operative fluid flow communication with respect to said media outlet means of said storage hopper means to receive blasting media therefrom;

(2) a conveying air line means operatively secured to said conveying air inlet means of said regulator housing means for supplying of conveying air to said regulator chamber means at a pressure not greater than atmospheric pressure, said conveying air line means being operatively secured in fluid flow communication with respect to said access port means defined in said storage hopper means to receive conveying air from said media supply chamber means at the same pressure as within said media supply chamber means, which is not greater than atmospheric pressure, in order to prevent conveying air from being supplied to said regulator chamber means at a pressure greater than the pressure at which the blasting media is supplied thereinto through said media outlet means defined in said storage hopper means to facilitate flow of blasting media into said regulator chamber means; and E. a media vacuum line means operatively secured to said gun media inlet means of said suction blasting gun means and also being operatively secured to said media and air vacuum outlet means of said regulator housing means to facilitate supplying of conveying air and blasting media under vacuum therethrough from said media supply regulator means to said mixing chamber means of said suction blasting gun means to facilitate pneumatic suction surface blasting therewith.

2. A pneumatic suction surface blasting apparatus having an improved media delivery regulating system being usable with various types of particulate blasting media as defined in claim 1 further comprising a media reclamation apparatus for collecting media after blasting therewith and resupplying thereof to said storage hopper means for reuse.

3. A pneumatic suction surface blasting apparatus having an improved media delivery regulating system being usable with various types of particulate blasting media comprising:

A. a suction blasting gun means defining a mixing chamber means therewithin, said suction blasting gun means further defining a high pressure air inlet means and a gun media inlet means each being in fluid flow communication with respect to said mixing chamber means defined therewithin to facilitate mixing of materials entering said mixing chamber means through said high pressure air inlet means and said media inlet means, said suction blasting gun means further including an outlet nozzle means in fluid flow communication with said mixing chamber means to guide expulsion therefrom, said high pressure air inlet means being oriented within said suction blasting gun means to supply high pressure air adjacent to said gun media inlet means to create a vacuum therewithin to facilitate the drawing of blasting media and conveying air therethrough;

B. a high pressure air line means operatively secured to a supply of high pressure air and to said high pressure air inlet means to supply high pressure air to said mixing chamber and through said outlet nozzle means in order to generate a suction at said gun media inlet means to facilitate drawing of particulate blasting media inwardly therethrough and for expelling thereof under high pressure through said outlet nozzle means for pneumatic surface blasting;

C. a storage hopper means defining a media supply chamber means therewithin hermetically isolated from the external ambient environment for holding blasting media for selective supply thereof for surface blasting, said media supply chamber means being unpressurized in order to be at a pressure therein not greater than ambient atmospheric pressure, said storage hopper means defining a media outlet means therein in fluid flow communication with said media supply chamber means and therebelow to facilitate exiting of media therefrom to facilitate blasting, said storage hopper means further defining an access port means therein in fluid flow communication with said media supply chamber means therewithin at a position above the level of blasting media retained therein;

D. a media supply regulator means operatively secured to said media outlet means of said storage hopper means for supplying of blasting media and air for conveying thereof, said media supply regulator means comprising:
  (1) a regulator housing means including a T-shaped housing means defining a regulator chamber means therewithin for mixing media with conveying air, said regulator housing means including a lower interior wall means, said regulator housing means further defining a media inlet means, a conveying air inlet means and a media and air vacuum outlet means each being in fluid flow communication with respect to said regulator chamber means, said media inlet means being in operative fluid flow communication with respect to said media outlet means of said storage hopper means to receive blasting media therefrom, said conveying air inlet means and said media and air vacuum outlet means being oriented co-linear with respect to one another;
  (2) a conveying air line means operatively secured to said conveying air inlet means of said regulator housing means for supplying of conveying air to said regulator chamber means at a pressure not greater than atmospheric pressure, said conveying air line means being operatively secured in fluid flow communication with respect to said access port means defined in said storage hopper means to receive conveying air from said media supply chamber means at the same pressure as within said media supply chamber means, which is not greater than atmospheric pressure, in order to prevent conveying air from being supplied to said regulator chamber means at a pressure greater than the pressure at which the blasting media is supplied thereinto through said media outlet means defined in said storage hopper means to facilitate flow of blasting media into said regulator chamber means;
  (3) a media metering nozzle means positioned extending through said media inlet means into said regulator chamber means, said media metering nozzle means defining a metering conduit means extending therethrough for controlling the supplying of blasting media from said media supply chamber means to said regulator chamber means within said media supply regulator means, said media metering nozzle means further defining a metering conduit dispensing opening means for controlling dispensing of blasting media through said media inlet means directly into said regulator chamber means, said media metering nozzle means being generally tubular in shape to define said metering conduit extending axially therethrough, said media metering nozzle means further including a metering orifice plate means being generally annularly-shaped and extending over said metering conduit opening means, said metering orifice plate means being integrally formed with respect to said media metering nozzle means, said metering orifice plate means defining a metering orifice means therein to further control dispensing of blasting media from said storage hopper means to said media supply regulator means, said metering orifice means being positioned approximately 0.5 inches from said media and air vacuum outlet means of said regulator housing means to facilitate movement of blasting media and conveying air thereto, said metering orifice means also being spatially disposed from said lower interior wall means by approximately 13/16th of an inch to provide sufficient clearance therebetween to facilitate full and efficient media flow during operative blasting, said metering orifice means being oriented approximately perpendicularly with respect to said conveying air inlet means and said media and air vacuum outlet means and spatially disposed therebetween;

E. a media vacuum line means operatively secured to said gun media inlet means of said suction blasting gun means and also being operatively secured to said media and air vacuum outlet means of said regulator housing means to facilitate supplying of conveying air and blasting media under vacuum therethrough from said media supply regulator means to said mixing chamber means of said suction blasting gun means to facilitate pneumatic suction surface blasting therewith; and F. a media reclamation apparatus for collecting media after blasting therewith and resupplying thereof to said storage hopper means for reuse.

4. A pneumatic suction surface blasting apparatus having an improved media delivery regulating system being usable with various types of particulate blasting media as defined in claim 1 wherein said media outlet means is positioned below said media supply chamber means to facilitate flow of blasting media therethrough by gravitationally forced flow.

5. A pneumatic suction surface blasting apparatus having an improved media delivery regulating system being usable with various types of particulate blasting media as defined in claim 1 wherein supplying of media from said media supply chamber through said media inlet means into said regulator chamber means is made at a pressure at least as great as the pressure of the conveying air delivered to said conveying air inlet means by said conveying air line means.

6. A pneumatic suction surface blasting apparatus having an improved media delivery regulating system being usable with various types of particulate blasting media as defined in claim 1 wherein said regulator housing means comprising a T-shaped housing with said conveying air inlet means and said media and air vacuum outlet means being oriented co-linearly with respect to one another.

7. A pneumatic suction surface blasting apparatus having an improved media delivery regulating system being usable with various types of particulate blasting media as defined in claim 1 wherein said media supply regulator means includes a media metering nozzle means positioned extending through said media inlet means into said regulator chamber means, said media metering nozzle means defining a metering conduit means extending therethrough for controlling the supplying of blasting media from said media supply chamber means to said regulator chamber means within said media supply regulator means, said media metering nozzle means further defining a metering conduit dispensing opening means for controlling dispensing of blasting media directly into said regulator chamber means through said media inlet means thereof.

8. A pneumatic suction surface blasting apparatus having an improved media delivery regulating system being usable with various types of particulate blasting media as defined in claim 7 wherein said media metering nozzle means is generally tubular in shape to define said metering conduit extending axially therethrough.

9. A pneumatic suction surface blasting apparatus having an improved media delivery regulating system being usable with various types of particulate blasting media as defined in claim 7 wherein said media metering nozzle means further includes a metering orifice plate means being generally annularly-shaped and extending over said metering conduit opening means, said metering orifice plate means defining a metering orifice means therein to further control dispensing of blasting media from said storage hopper means to said media supply regulator means.

10. A pneumatic suction surface blasting apparatus having an improved media delivery regulating system being usable with various types of particulate blasting media as defined in claim 9 wherein said metering orifice plate means and said media metering nozzle means are formed as a single integral member.

11. A pneumatic suction surface blasting apparatus having an improved media delivery regulating system being usable with various types of particulate blasting media as defined in claim 9 wherein said regulator housing means includes a lower interior wall means below said media metering nozzle means and wherein said media metering orifice means is positioned within said regulator chamber means approximately $13/16$th of an inch from said lower interior wall means to provide sufficient clearance therebetween to facilitate full and efficient media flow during operative blasting.

12. A pneumatic suction surface blasting apparatus having an improved media delivery regulating system being usable with various types of particulate blasting media as defined in claim 9 wherein said metering orifice means is positioned approximately 0.5 inches from said media and air vacuum outlet means of said regulator housing means to facilitate movement of blasting media and conveying air thereto.

13. A pneumatic suction surface blasting apparatus having an improved media delivery regulating system being usable with various types of particulate blasting media as defined in claim 9 wherein said metering orifice means is positioned spatially disposed from said conveying air in let means and said media and air vacuum outlet means.

14. A pneumatic suction surface blasting apparatus having an improved media delivery regulating system being usable with various types of particulate blasting media as defined in claim 9 wherein said metering orifice means is positioned between said conveying air inlet means and said media and air vacuum outlet means.

15. A pneumatic suction surface blasting apparatus having an improved media delivery regulating system being usable with various types of particulate blasting media as defined in claim 9 wherein said metering orifice means is oriented approximately perpendicularly with respect to said conveying air inlet means and said media and air vacuum outlet means and spatially therebetween.

16. A pneumatic suction surface blasting apparatus having an improved media delivery regulating system being usable with various types of particulate blasting media as defined in claim 1 wherein said high pressure air inlet means of said suction blasting gun means is oriented therewithin to supply high pressure air adjacent to said gun media inlet means to create a vacuum therewithin to facilitate the drawing of blasting media and conveying air therethrough from said media vacuum line means.

17. A pneumatic suction surface blasting apparatus having an improved media delivery regulating system being usable with various types of particulate blasting media as defined in claim 1 wherein said metering orifice means is of a given fixed predetermined size.

18. A pneumatic suction surface blasting apparatus having an improved media delivery regulating system being usable with various types of particulate blasting media as defined in claim 1 wherein said conveying air line means can be configured with an increased length in order to increase the difference in pressure of delivery of said blasting media through said media inlet means in comparison with the pressure of conveying air delivered through said conveying air inlet means.

19. A pneumatic suction surface blasting apparatus having an improved media delivery regulating system being usable with various types of particulate blasting media comprising:

A. a suction blasting gun means defining a mixing chamber means therewithin, said suction blasting gun means further defining a high pressure air inlet means and a gun media inlet means each being in fluid flow communication with respect to said mixing chamber means defined therewithin to facilitate mixing of materials entering said mixing chamber means through said high pressure air inlet means and said media inlet means, said suction blasting gun means further including an outlet nozzle means in fluid flow communication with said mixing chamber means to guide expulsion therefrom;

B. a high pressure air line means operatively secured to a supply of high pressure air and to said high pressure air inlet means to supply high pressure air to said mixing chamber and through said outlet nozzle means in order to generate a suction at said gun media inlet means to facilitate drawing of particulate blasting media inwardly therethrough and for expelling thereof under high pressure through said outlet nozzle means for pneumatic surface blasting;

C. a storage hopper means defining a media supply chamber means therewithin sealed with respect to the external ambient environment for holding blasting media for selective supply thereof for surface blasting, said media supply chamber means being unpressurized in order to be at a pressure therein not greater than ambient atmospheric pressure, said storage hopper means defining a media outlet means therein in fluid flow communication with said media supply chamber means and therebelow to facilitate exiting of media therefrom to facilitate blasting, said storage hopper means further defining an access port means therein in fluid flow communication with said media supply chamber means therewithin at a position above the level of blasting media retained therein;

D. a media supply regulator means operatively secured to said media outlet means of said storage hopper means for supplying of blasting media and air for conveying thereof, said media supply regulator means comprising:
  (1) a regulator housing means including a T-shaped housing means defining a regulator chamber means therewithin for mixing media with conveying air, said regulator housing means further defining a media inlet means, a conveying air inlet means and a media and air vacuum outlet means each being in fluid flow communication with respect to said regulator chamber means, said media inlet means being in operative fluid flow communication with respect to said media outlet means of said storage hopper means to receive blasting media therefrom, said conveying air inlet means and said media and air vacuum outlet means being oriented co-linear with respect to one another;
  (2) a conveying air line means operatively secured to said conveying air inlet means of said regulator housing means for supplying of conveying air to said regulator chamber means at a pressure not greater than atmospheric pressure, said conveying air line means being operatively secured in fluid flow communication with respect to said access port means defined in said storage hopper means to receive conveying air from said media supply chamber means at the same pressure as within said media supply chamber means, which is not greater than atmospheric, in order to prevent conveying air from being supplied to said regulator chamber means at a pressure greater than the pressure at which the blasting media is supplied thereinto through said media outlet means defined in said storage hopper means to facilitate flow of blasting media into said regulator chamber means;
  (3) a media metering nozzle means positioned extending through said media inlet means into said regulator chamber means, said media metering nozzle means defining a metering conduit means extending therethrough for controlling the supplying of blasting media from said media supply chamber means to said regulator chamber means within said media supply regulator means, said media metering nozzle means further defining a metering conduit dispensing opening means for controlling dispensing of blasting media through said media inlet means directly into said regulator chamber means, said media metering nozzle means being generally tubular in shape to define said metering conduit extending axially therethrough, said media metering nozzle means further including a metering orifice plate means being generally annularly-shaped and extending over said metering conduit opening means, said metering orifice plate means defining a metering orifice means therein to further control dispensing of blasting media from said storage hopper means to said media supply regulator means, said metering orifice means being positioning spatially disposed from said conveying air inlet means and said media and air vacuum outlet means and therebetween; and E. a media vacuum line means operatively secured to said gun media inlet means of said suction blasting gun means and also being operatively secured to said media and air vacuum outlet means of said regulator housing means to facilitate supplying of conveying air and blasting media under vacuum therethrough from said media supply regulator means to said mixing chamber means of said suction blasting gun means to facilitate pneumatic suction surface blasting therewith.

\* \* \* \* \*